United States Patent Office 3,180,761
Patented Apr. 27, 1965

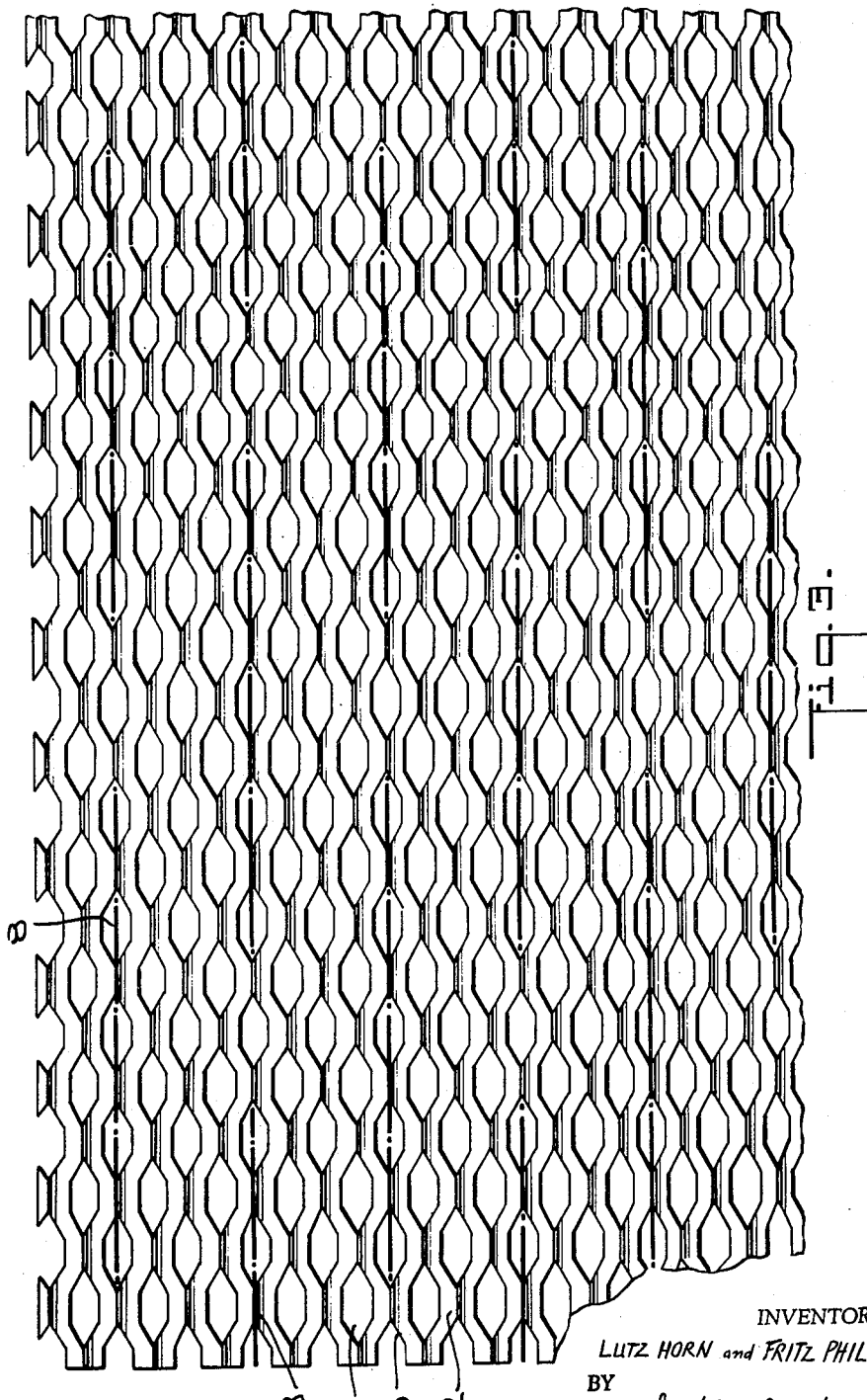

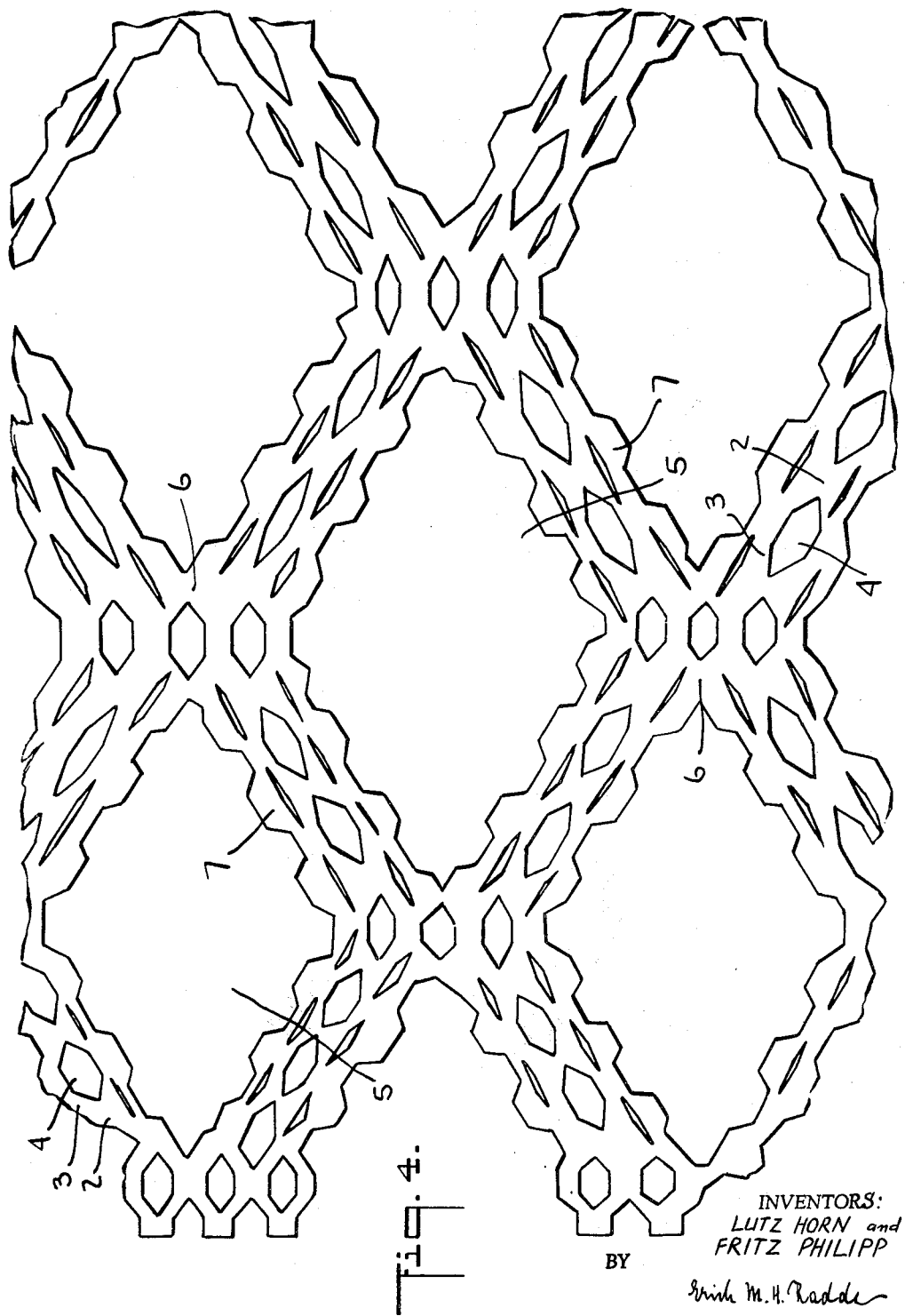

3,180,761
ELECTROCHEMICAL CELL ELECTRODE CONTAINING AN EXPANDED METAL GRID
Lutz Horn, Hagen, Westphalia, and Fritz Philipp, Hagen-Haspe, Westphalia, Germany, assignors to Varta Aktiengesellschaft, Frankfurt am Main, Germany, a company of Germany
Original application Jan. 21, 1960, Ser. No. 3,914, now Patent No. 3,099,899, dated Aug. 6, 1963. Divided and this application Apr. 25, 1963, Ser. No. 275,769
Claims priority, application Germany, Jan. 24, 1959, A 31,192
4 Claims. (Cl. 136—51)

This is a division of application Serial No. 3,914, filed January 21, 1960, now Patent No. 3,099,899, granted August 6, 1963.

The present invention relates to improvements in electrodes for electrochemical cells, and more particularly to improve grids for battery plates.

Expanded metal has proved to be of value as a grid for pasted storage battery plates, the active electrode material being completely or partly carried in the mesh openings of an expanded metal sheet constituting the grid of the electrode. More recently, attempts have been made to use electrode grids consisting of two kinds of expanded metal of different mesh size in the form of a laminated structure.

Conventional expanded metal sheets are made by cutting slits into a metal sheet or foil and then stretching the same. In this process, the bonds of the expanded metal sheet form slanted planes in respect of a plane extending centrally within the sheet. The thickness of the expanded metal structure is determined by the width of these planes in the direction in which the slitted metal sheets are stretched and by their angle of inclination. The connecting strands between the bonds are about half the width of the bonds but have the same angle of inclination. When looking at the expanded metal structure in the direction of the planes of the bonds, the entire structure gives the appearance of honeycombed, approximately hexagonal webs.

When operating a storage battery, the direction of the current lines is usually vertical to the plane of the electrode. Using conventional expanded metal grids for such electrodes, the available area traversed by the current and the effective surface of the active mass will be decreased more or less, depending upon the angle of inclination of the strands and bonds in relation to the central plane of the plate. The thickness of the stretched grid and the angle of inclination are correlated to each other. An almost vertical arrangement of the strands in the stretched grid is possible only if the strands are short and narrow. The pitch angle of the conventional expanded metal sheet is so small that, in projection, the area formed by the mesh openings and, consequently, the effective surface of the active mass therein is reduced considerably. As a result, the active mass is partly covered by the metal and its effectiveness is thus impaired.

Another disadvantage of conventional expanded metal grids is the poor adhesiveness of the active material to the slanted surfaces of the strands and bonds, such as nickel carbonyl powder sintered to the grid. Such electrodes tend to lose their active material during operation of the battery. The service life of storage batteries in which the carrier of the active mass is a conventional expanded metal grid is thus considerably decreased and the voltage level and the efficiency of the active mass are noticeably impaired.

It is, therefore, one object of the present invention to provide a novel expanded metal structure as the grid carrying the active material of an electrochemical cell electrode, which grid is substantially free of the disadvantages of conventional expanded metal grids, which facilitates access of the electrolyte to the active mass, which considerably increases the effective surface and, thus, the efficiency of the active material, and which, at the same time, increases the adherence of the active material to the grid and substantially diminishes shedding and spilling of the active material.

Other objects and advantageous features of the present invention will become apparent as the description of a preferred embodiment thereof proceeds.

The expanded metal sheet constituting the electrode grid of this invention is produced by first stamping or cutting small slits into a suitable metal sheet or foil and stretching the slitted sheet or foil into an expanded metal structure having mesh openings. Thereafter, the resulting expanded metal structure's bonds and strands are slitted and stretched, the latter slits being larger than the slits cut for the preliminary stretching step. The second stretching step results in an expanded metal sheet with small and large mesh openings. This double-stretched, three-dimensional expanded metal sheet consists of metal strips having bonds and strands, the strands interconnecting the bonds and each four adjacent ones of the bonds interconnected by four of the strands defining a mesh opening. The metal strips are slanted transversely in respect of a plane extending centrally within the sheet. Each of these strips also is a three-dimensional expanded metal sheet and each strip also has bonds and strands defining additional mesh openings therebetween. The latter bonds and strands are slanted transversely in respect of a plane extending centrally therewithin and the adidtional mesh openings are substantially smaller than the first-mentioned mesh openings. Electrode grids made of such expanded metal grids with mesh openings of different sizes permit better pasting of the active material carried within the mesh openings or better introduction of active material metal powder to be sintered to its bonds and strands. The active mass or sintered metal powder adheres considerably better thereto. The active mass or sintered metal powder is distribtued throughout the smaller and larger mesh openings in such grids. The recesses, notches, and the like produced in the second stretching step in the strands and bonds defining the larger meshes considerably improve the adherence of the active material or sintered metal to the expanded metal grid. As a result thereof, the active material or sintered metal are firmly bonded to, and united with the grid. At the same time, the grid serves as the current conductor for the plate.

Due to the fact that the expanded metal grid is obtained by stretching the sheet twice, the total volume of mesh openings and, consequently, its receptivity for the active mass is increased.

The expanded metal sheet grids of the present invention may be made of any suitable electrolyte-resistant metal, for instance, nickel and nickel alloys. Alternatively or additionally, the grid may be provided with a protective surface layer, for instance, by anodic oxidation, in which case the sheet metal itself need not be resistant to electrolyte corrosion. If desired, two or more layers of the expanded metal may be laminated to yield especially effective electrode structures. Alternatively, such laminated grids may be formed of novel expanded metal sheets combined with conventional expanded metal sheets and/or metal wire nets and the like.

For a further understanding of the present invention reference is to be had to the following description and the accompanying drawings, wherein:

FIG. 3 illustrates a top view of a prestretched expanded metal sheet provided with cuts for final stretching;

FIG. 4 illustrates a top view of a double stretched expanded metal sheet for a grid according to the present invention;

FIG. 5 illustrates a partial front view of a pasted storage battery plate using as a grid a double stretched expanded metal sheet partly pasted with active mass; and FIG. 6 illustrates a sectional view through a composite electrode grid composed of two expanded metal grids according to the present invention and a non-expanded compact metal sheet therebetween.

In these figures, like reference numerals indicate like parts throughout the several views.

FIG. 1 shows the small incisions 1 cut into the unexpanded metal sheet.

Figure 1:
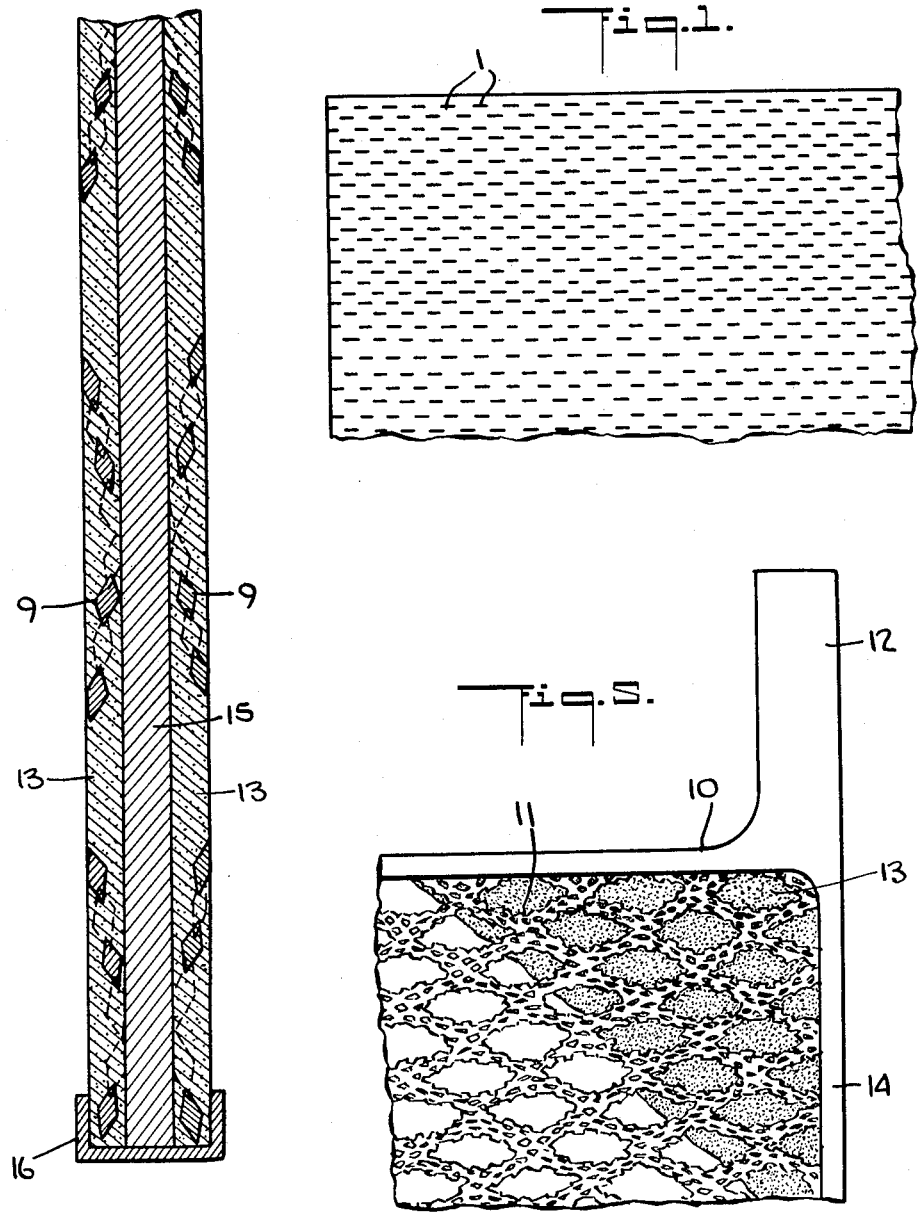
FIG. 1 illustrates a top view of a metal sheet provided with small cuts for preliminary stretching.
Figure 2:
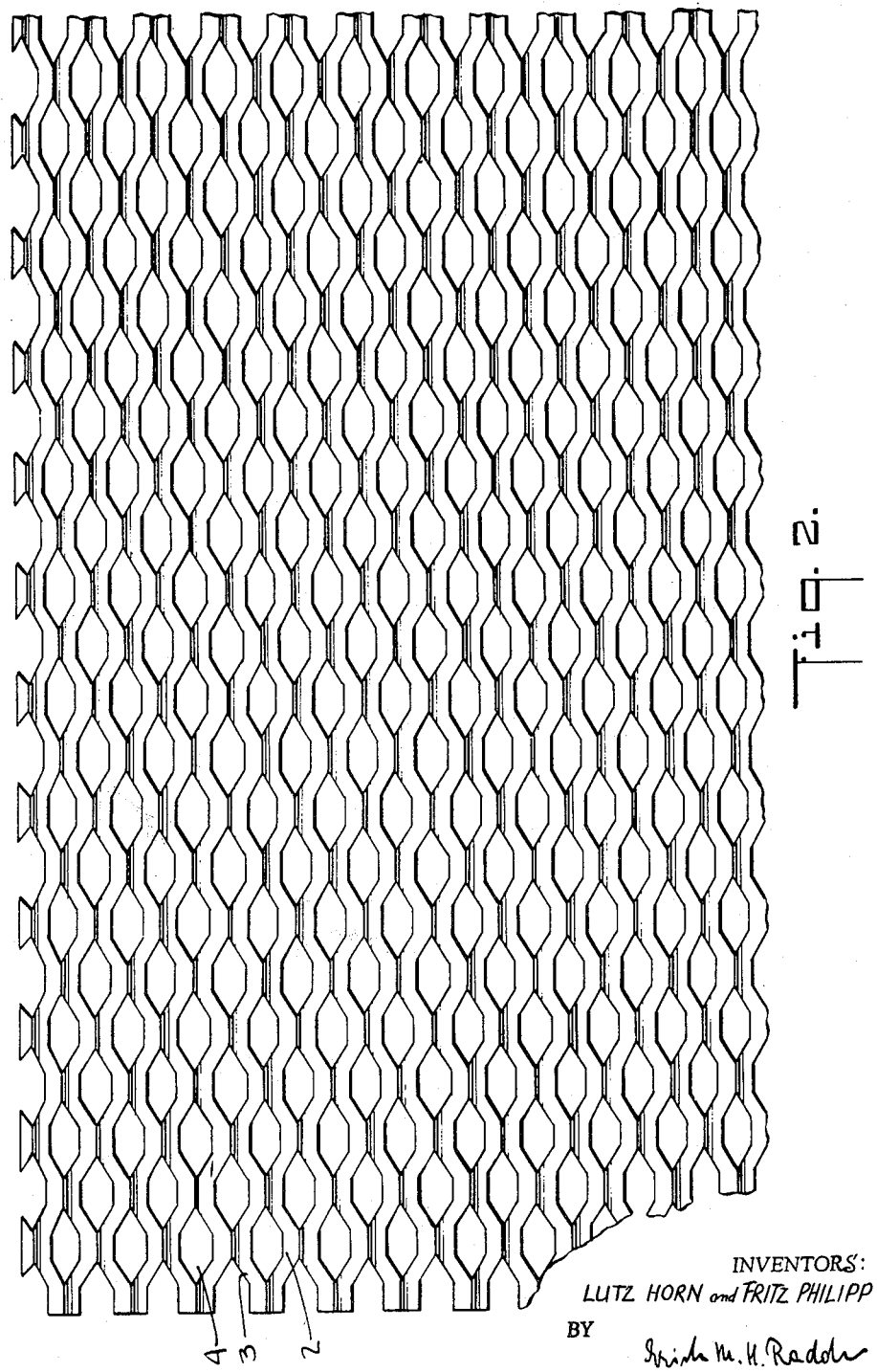
FIG. 2 illustrates a top view of an expanded metal sheet after preliminary stretching according to the present invention.

FIGS. 2 and 3 show bonds 2 of the expanded metal sheet between mesh openings 4 and strands 3 connecting the bonds 2 and forming therewith the mesh openings 4. In FIG. 3 larger slits 8 are stamped or cut into the preliminary expanded metal sheet of FIG. 2. In FIG. 4 there are illustrated smaller mesh openings 4 formed by bonds 2 and strands 3, while larger mesh openings 5 are formed by strands 7 and bonds 6. The latter strands and bonds do not consist of compact metal but, as can readily be seen, are formed of the expanded metal obtained on prestretching. In this manner, the double stretched expanded metal sheet 9 according to the present invention is obtained.

FIG. 5 illustrates electrode 10 composed of the double stretched expanded metal grid 11 with lug 12. Said grid 11 contains active mass 13 pasted in the small mesh openings 4 as well as in the larger mesh openings 5. Said grid 11 is mounted in frame 14.

FIG. 6 is a cross-sectional view through a three-ply metal sheet consisting of the double stretched expanded metal sheets 9 and a solid unexpanded metal sheet 15, the three sheets being kept in close contact with each other by frame 16. The solid metal sheet 15 may be replaced by a conventional expanded metal sheet. It imparts greater stability and rigidity to the expanded metal sheets.

The metal sheets to be expanded may have any desired thickness. For electrodes made of steel, a thickness between about 0.8 mm. and about 1.5 mm. has proved to be satisfactory.

The slits or incisions cut into the metal sheet for producing the pre-stretched expanded metal sheet of FIG. 2 are, of course, smaller than the slits or incisions 8 (FIG. 3) cut or stamped into the pre-stretched expanded metal sheet (FIG. 2). The difference in length of the unexpanded incisions 1, on the one hand, and the unexpanded incisions 8, on the other hand, is between about 1:2 and about 1:10. The preferred difference in length is about 1:5 although the invention is not limited thereto.

The small slits or incisions in the pre-stretched expanded metal sheet (FIG. 2) have, for instance, a length between about 0.6 mm. and about 1.2 mm. and preferably a length between about 0.8 mm. and 1.0 mm. The distance between the incisions in horizontal direction is between about 0.3 mm. and about 1.2 mm. and preferably between about 0.4 mm. and about 0.5 mm., while the distance in vertical direction, i.e. vertically to the incisions is between about 0.1 mm. and about 0.4 mm. and preferably between about 0.15 mm. and about 0.3 mm.

The larger incisions or slits as shown in FIG. 3 have, for instance, a length between about 4.0 mm. and about 10.0 mm. and preferably a length between about 5.0 mm. and about 7.0 mm. Their distance from each other in horizontal direction is between about 10.0 mm. and about 4.0 mm., while the distance in vertical direction, i.e. vertically to the larger incisions is between about 0.6 mm. and about 2.0 mm. and preferably between about 0.8 mm. and about 1.2 mm.

Preliminary stretching to produce the expanded metal sheet structure of FIG. 2 is effected by placing the one end of the metal sheet provided with small incisions into a vise and stretching it vertically to the incisions. The force to be applied depends, of course, upon the material composing the metal sheet and its thickness. For instance, for nickel sheets of a thickness of 0.1 mm. and with small incisions of 1.5 mm. length with 0.75 mm. distance between the incisions in horizontal direction and 0.2 mm. distance in vertical direction a force of 10.0 kg./sq. cm. is applied while for sheets of lead alloy as they are used for electrodes in storage batteries and having the same thickness and arrangement of incisions, the force to be applied is 10.0 kg./sq. cm. As the art of producing expanded metal is well known and familiar to those skilled in this field, it is understood that only so much of this procedure will be described as will be necessary for an understanding of this invention. Many details of the stretching process and apparatus are omitted as interfering with a consideration of the invention and will readily be supplied by those skilled in this art.

Likewise, when carrying out final stretching of the pre-expanded metal sheet of FIG. 3, the stretching force to be applied to one end of the metal sheet depends upon the material composing, and the thickness of, the metal sheet and the size of the incision. For instance, for pre-stretched expanded nickel sheets, as described hereinabove, with large incisions of 6.0 mm. length and a distance of 3.0 mm. between the incisions in horizontal direction and of 1.5 mm. in vertical direction, a force of 10.0 kg./sq. cm. is applied while for sheets of lead alloy as described above for pre-stretched expanded nickel sheets, the stretching force to be applied is about 10.0 kg./sq. cm.

It is understood that the larger cuts or incisions can be provided not only parallel to the smaller incisions but also veritcal or at an angle thereto.

As pointed out hereinabove, the double stretched expanded metal sheets according to the present invention are of particular usefulness for making electrodes for storage batteries. The available area traversed by the current and the effective surface of the active mass are considerably increased in comparison to that of conventional expanded metal electrodes so that the active mass is more fully utilized than heretofore possible, and the service life of the electrodes is prolonged due to the better adherence of the active mass to the grid.

Of course many changes and variations in the composition of the metal sheets used for making the double stretched expanded metal according to the present invention, in the size and arrangement of the slits or incisions, in the forces used for pre-stretching and for final stretching, and the like may be made by those skilled in the art in accordance with the principles set forth herein and in the claims annexed hereto.

We claim:

1. In an electrochemical cell: an electrode comprising a three-dimensional expanded metal grid, said grid being a metal sheet consisting of metal strips having bonds and strands, the strands interconnecting the bonds and each four adjacent ones of the bonds interconnected by four of the strands defining a mesh opening, the metal strips being slanted transversely in respect of a plane extending centrally within the sheet, each of the metal strips being a three-dimensional expanded metal sheet, each of the strips also having bonds and strands defining additional mesh openings therebetween, the latter bonds and strands being slanted transversely in respect of a plane extending centrally therewithin, the additional mesh openings being substantially smaller than the first-mentioned mesh openings, active material within the mesh openings of the grid, and an outer framework holding the grid, the outer framework being more rigid than the expanded metal grid.

2. The electrochemical cell electrode of claim 1, wherein the first-mentioned mesh openings of the grid have a length about two to ten times that of the additional mesh openings.

3. The electrochemical cell electrode of claim 2, wherein the length of the first-mentioned mesh openings is about five times that of the additional mesh openings.

4. The electrochemical cell electrode of claim 1, wherein the first-mentioned bonds have about twice the width of the first-mentioned strands.

References Cited by the Examiner
UNITED STATES PATENTS

| | | | |
|---|---|---|---|
| 905,952 | 12/08 | Szek | 136—120 |
| 2,909,586 | 10/59 | Hagspihl | 136—28 |
| 3,069,486 | 12/62 | Solomon et al. | 136—30 |

FOREIGN PATENTS 607,815  11/60  Canada.

JOHN H. MACK, *Primary Examiner.*